US012689142B2

(12) United States Patent
Puyraimond

(10) Patent No.: US 12,689,142 B2
(45) Date of Patent: Jul. 21, 2026

(54) NON-ALIGNED CONTACT

(71) Applicant: Hypertac S.A., Saint-Aubin-lès-Elbeuf (FR)

(72) Inventor: Hervé Puyraimond, Saint-Aubin-lès-Elbeuf (FR)

(73) Assignee: HYPERTAC S.A.

( * ) Notice: Subject to any disclaimer, the term of this patent is extended or adjusted under 35 U.S.C. 154(b) by 308 days.

(21) Appl. No.: 18/562,018

(22) PCT Filed: May 17, 2022

(86) PCT No.: PCT/GB2022/051234
§ 371 (c)(1),
(2) Date: Nov. 17, 2023

(87) PCT Pub. No.: WO2022/243668
PCT Pub. Date: Nov. 24, 2022

(65) Prior Publication Data

US 2024/0145970 A1 May 2, 2024

(30) Foreign Application Priority Data

May 18, 2021 (GB) ..................................... 2107077

(51) Int. Cl.
*H01R 13/10* (2006.01)
*H01R 13/04* (2006.01)
*H01R 43/16* (2006.01)

(52) U.S. Cl.
CPC ............. *H01R 13/10* (2013.01); *H01R 13/04* (2013.01); *H01R 43/16* (2013.01)

(58) Field of Classification Search
CPC ........ H01R 13/10; H01R 13/04; H01R 43/16; H01R 4/023; H01R 11/01; H01R 11/09;
(Continued)

(56) References Cited

U.S. PATENT DOCUMENTS 7,229,327 B2 * 6/2007 Zhao .................. H01M 50/517 439/840
8,721,368 B2 * 5/2014 Zhao ...................... H01R 11/01 439/627

(Continued)

FOREIGN PATENT DOCUMENTS

CN 202797325 U 3/2013
CN 205016699 U 2/2016

(Continued)

OTHER PUBLICATIONS

International Search Report and Written Opinion for International Application No. PCT/GB22/51234, dated Sep. 9, 2022, 2 pps.

(Continued)

*Primary Examiner* — Edwin A. Leon
(74) *Attorney, Agent, or Firm* — Armstrong Teasdale LLP

(57) ABSTRACT

An electrical contact for a connector is provided. The electrical contact includes a conductive engaging part extending substantially along a first longitudinal axis, a conductive wiring part extending substantially along a second longitudinal axis, and a conductive junction part configured to electrically connect the engaging part and the wiring part, such that the first longitudinal axis of the engaging part is substantially parallel to and offset with respect the second longitudinal axis of the wiring part, and wherein the engaging part and the wiring part at least partially overlap each other, substantially along the first longitudinal axis and the second longitudinal axis.

13 Claims, 7 Drawing Sheets

(58) Field of Classification Search
CPC .... H01R 13/02; H01R 13/2442; H01R 13/24; H01R 13/187
See application file for complete search history.

(56) References Cited

U.S. PATENT DOCUMENTS

| | | | | |
|---|---|---|---|---|
| 8,992,268 | B2 * | 3/2015 | Casses | H01R 11/288 439/627 |
| 2015/0056870 | A1 | 2/2015 | Chen | |

FOREIGN PATENT DOCUMENTS

| | | | |
|---|---|---|---|
| CN | 207052777 | U | 2/2018 |
| CN | 108258440 | A | 7/2018 |
| DE | 202005019724 | U1 | 3/2007 |
| WO | 2014095365 | A1 | 6/2014 |

OTHER PUBLICATIONS

British Search Report for Application No. GB2107077.6, dated Feb. 17, 2022, 4 pps.

* cited by examiner

NON-ALIGNED CONTACT

CROSS-REFERENCE TO RELATED APPLICATIONS

The present application is a national stage entry of PCT/GB2022/051234 filed on May 17, 2022, which claims the benefit of GB Patent Application No. 2107077.6 filed on May 18, 2021, the contents of which are hereby incorporated by reference in their entirety.

BACKGROUND

The disclosure relates but is not limited to an electrical contact for an electrical connector. The disclosure also relates to a connector comprising the contact and a method of manufacture.

An electrical connector usually includes at least one contact fitted in an insulator. Each contact may include a conductive wiring part, for electrically connecting with electrical wiring of the connector. Each contact may include a female engaging part (e.g. a socket) configured to be mated with a male engaging part (e.g. a pin) of another connector and/or may include a male engaging part (e.g. a pin) configured to be mated with a female engaging part (e.g. a socket) of another connector.

An electrical plug usually includes a mobile connector. The electrical plug may include male contacts (e.g. including pins) and/or female contacts (e.g. sockets). An electrical receptacle usually includes a fixed connector (e.g. fixed in a wall). The electrical receptacle may include male contacts (e.g. including pins) and/or female contacts (e.g. sockets). The electrical plug may be mated with the electrical receptacle.

The electrical contacts may be spatially cumbersome, resulting in connectors which are spatially too cumbersome for some applications.

BRIEF DESCRIPTION

Aspects and embodiments of the disclosure are set out in the appended claims. These and other aspects and embodiments of the disclosure are also described herein.

BRIEF DESCRIPTION OF THE DRAWINGS

Aspects of the disclosure will now be described, by way of example, with reference to the accompanying drawings in which.

In the drawings, similar elements bear identical numerical references.

DETAILED DESCRIPTION

Overview

Figure 1A:
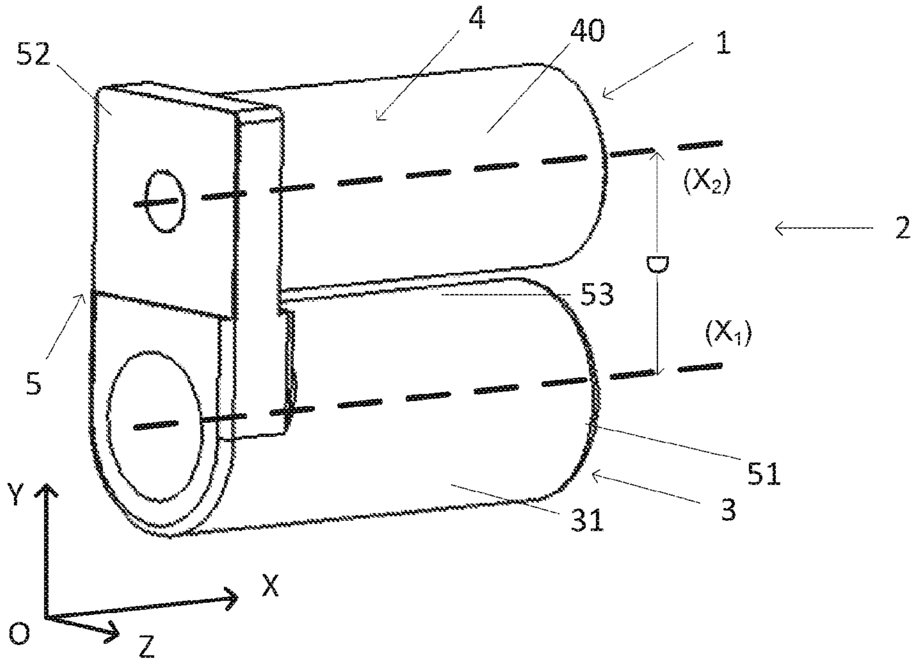
FIGS. 1A and 1B schematically illustrate elevation views in perspective of a first example embodiment of a contact.

The disclosure relates but is not limited to an electrical contact for a connector. The contact includes an engaging part which is configured to cooperate with another electrical contact of another connector. The contact also includes a wiring part for connection to wiring of the connector.

The engaging part and the wiring part have respective axes and are offset with respect to each other in an overlapping configuration along their respective axes, such that the engaging part and the wiring part are not aligned along a same axis.

A contact according to the disclosure is shorter, in a direction parallel to the respective axes, than a contact where the engaging part and the wiring part are aligned along a same axis. A connector including such a contact is shorter, in the direction parallel to the respective axes, than a connector including a contact where the engaging part and the wiring part are aligned along a same axis.

The contact may be used in applications where a reduced axial footprint of the contact or the corresponding connector is desirable.

Detailed Description of Example Embodiments

The Figures schematically illustrate examples of one or more electrical contacts 1 for an electrical connector 2. The one or more electrical contacts 1 are configured to be fitted in an electrical insulator 6 (shown in FIG. 5) of the connector 2.

The contact 1 mainly includes a conductive engaging part 3, a conductive wiring part 4 and a conductive junction part 5 configured to electrically connect the engaging part 3 and the wiring part 4.

The conductive engaging part 3 extends substantially along a first longitudinal axis ($X_1$).

The conductive engaging part 3 is configured to electrically connect with a corresponding conductive engaging part 8 (shown in FIG. 5) of another electrical contact of another connector (not shown in the Figures). As illustrated in FIGS. 1A-C, 3A-C and 5, the engaging part 3 may include a barrel 31 so that the contact 1 forms a female contact. As illustrated in FIGS. 2A-C and 4A-C, the engaging part 3 may comprise a pin 32 so that the contact 1 forms a male contact.

The conductive wiring part 4 extends substantially along a second longitudinal axis ($X_2$).

The conductive wiring part 4 is configured to electrically connect with electrical wiring 7 (shown in FIG. 5) of the connector 2. As illustrated in the Figures, the wiring part 4 may include a barrel 40 for connecting with the electrical wiring of the connector by at least one of soldering or mechanical plastic deformation.

As illustrated in the Figures, the conductive junction part 5 is configured to electrically connect the engaging part 3 and the wiring part 4 such that the first longitudinal axis ($X_1$) of the engaging part 3 is substantially parallel to the second longitudinal axis ($X_2$) of the wiring part 4. The first longitudinal axis ($X_1$) of the engaging part 3 and the second longitudinal axis ($X_2$) of the wiring part 4 may be substantially parallel to each other.

In the Figures, the first longitudinal axis ($X_1$) of the engaging part 3 and the second longitudinal axis ($X_2$) of the wiring part 4 are offset with respect to each other so that the engaging part 3 and the wiring part 4 are not aligned with each other. The first longitudinal axis ($X_1$) of the engaging part 3 and the second longitudinal axis ($X_2$) of the wiring part 4 are not mutually superimposed. The first longitudinal axis ($X_1$) of the engaging part 3 does not extend in the continuity of the second longitudinal axis ($X_2$) of the wiring part 4. In the Figures, the offset is schematically represented by a distance D between the axis ($X_1$) and the axis ($X_2$).

In the Figures, the junction part 5 is further configured to electrically connect the engaging part 3 and the wiring part 4 such that the engaging part and the wiring part at least partially overlap each other, substantially along the first longitudinal axis ($X_1$) and the second longitudinal axis ($X_2$). In the Figures, the overlap substantially along the first longitudinal axis ($X_1$) and the second longitudinal axis ($X_2$) is represented by a distance Δ. In the Figures, the engaging part 3 and the wiring part 4 extend next to each other such that an axial extension, in a direction substantially parallel to the longitudinal axis ($X_1$) and the longitudinal axis ($X_2$), of an assembly formed by the engaging part 3 and the wiring part 4 is shorter than a sum of the respective longitudinal dimensions of the engaging part 3 and the wiring part 4.

The distance D may be any distance which enables the engaging part 3 and the wiring part 4 to extend next to each other with an overlap substantially along the first longitudinal axis ($X_1$) and the second longitudinal axis ($X_2$).

As illustrated in the Figures, the junction part 5 includes a first link 51, a second link 52 and a body 53 extending between the first link 51 and the second link 52. In the figures, the first link 51, the second link 52 and the body 53 are made integral with each other. In some examples, the first link, the second link and the body may be made of several parts affixed to each other, by any means.

The first link 51 is configured to link with the engaging part 3, as explained in more detail below. The second link 52 is configured to link with the wiring part 4, as explained in more detail below.

As illustrated in the Figures, the first link 51, the body 53 and the second link 52 have substantially a shape having two shoulders 54. The two shoulders 54 are configured to enable the engaging part 3 and the wiring part 4 to extend next to each other with an overlap substantially along the first longitudinal axis ($X_1$) and the second longitudinal axis ($X_2$).

Figure 5:
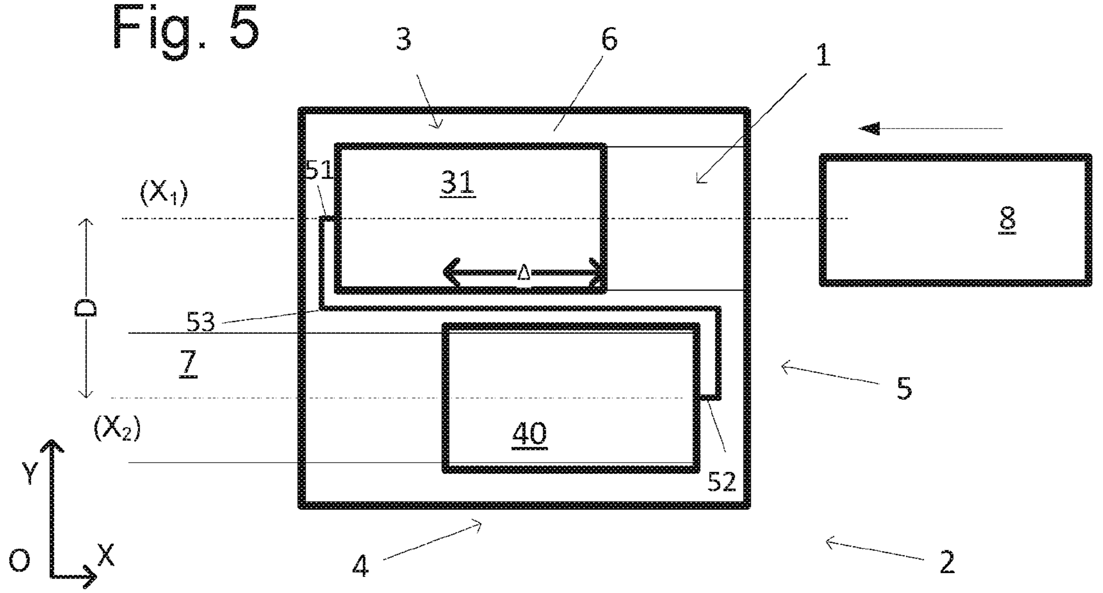
FIG. 5 schematically illustrates a cross section of a fifth example embodiment of a contact.

The body 53 is further configured to extend between the engaging part 3 and the wiring part 4, substantially along the first longitudinal axis ($X_1$) and substantially along the second longitudinal axis ($X_2$), to at least partially overlap the engaging part 3 and the wiring part 4, e.g. as illustrated in FIGS. 1A-C, 2A-C, 3A-C and 4A-C. As illustrated in FIG. 5, the body 53 is further configured to extend between the engaging part 3 and the wiring part 4 to fully overlap the engaging part 3 and the wiring part 4.

Figure 1B:
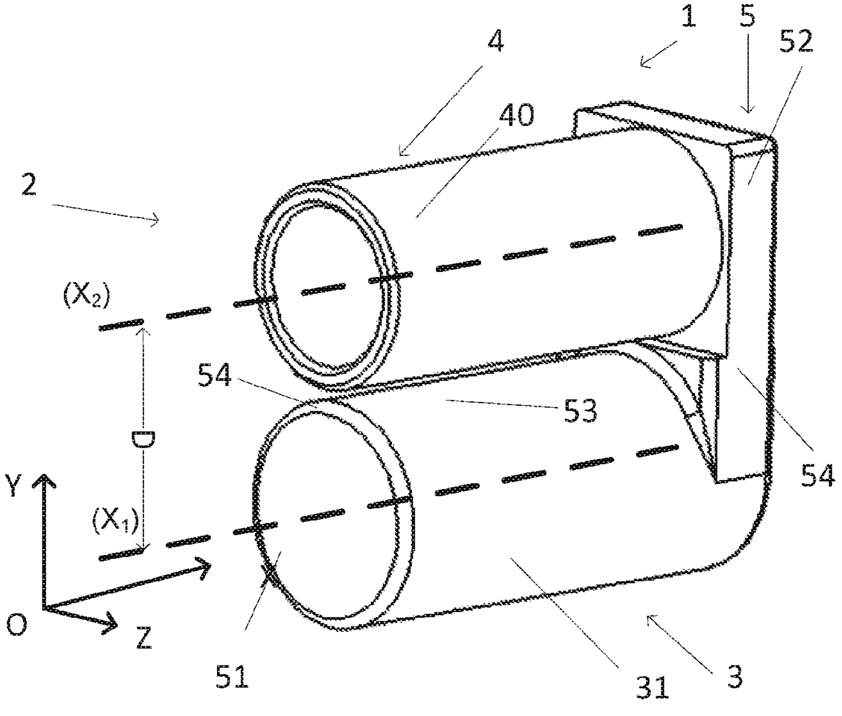
Figure 1C:
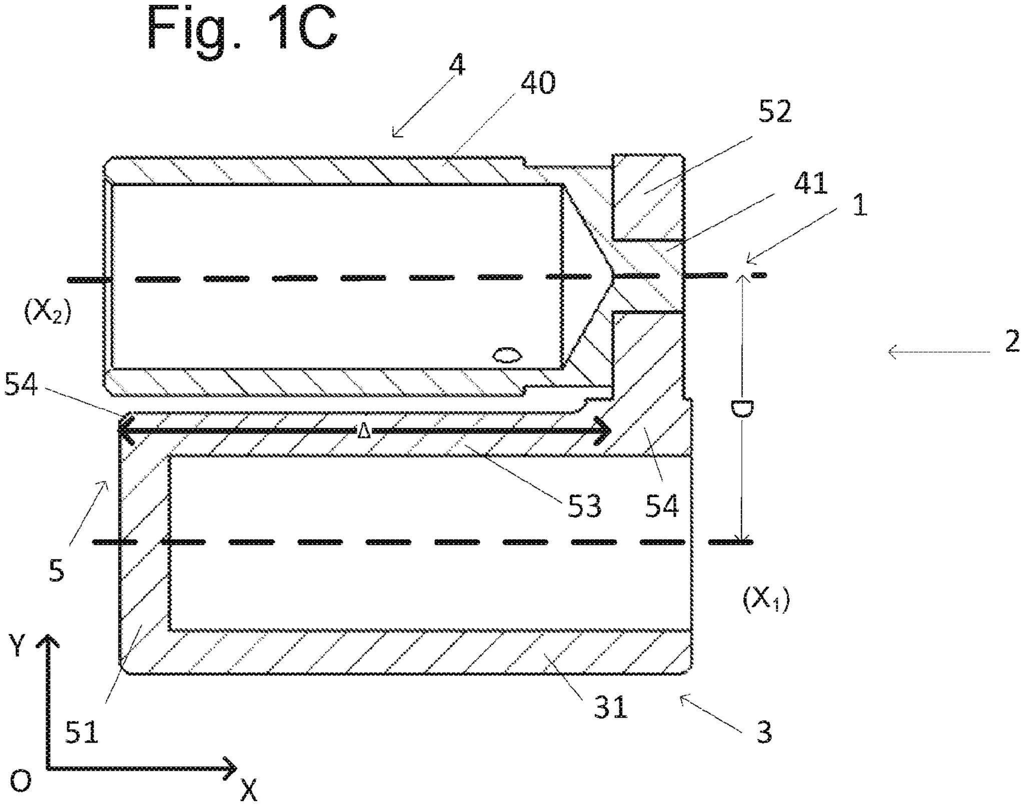
FIG. 1C schematically illustrates a cross section of the first example embodiment of FIGS. 1A and 1B.

As illustrated in FIGS. 1A-C, the first link 51 of the junction part 5 may include a block surrounding at least partially the engaging part 3. The block of the first link 51 may be formed integral with the barrel 31 of the engaging part 3. As illustrated in FIGS. 1A-C, the body 53 may include a block, the block surrounding at least partially the engaging part 3. The block of the body 53 may be formed integral with the barrel 31 of the engaging part 3. The block of the body 53 and the block of the first link 51 may be formed integral with each other.

Figure 2A:
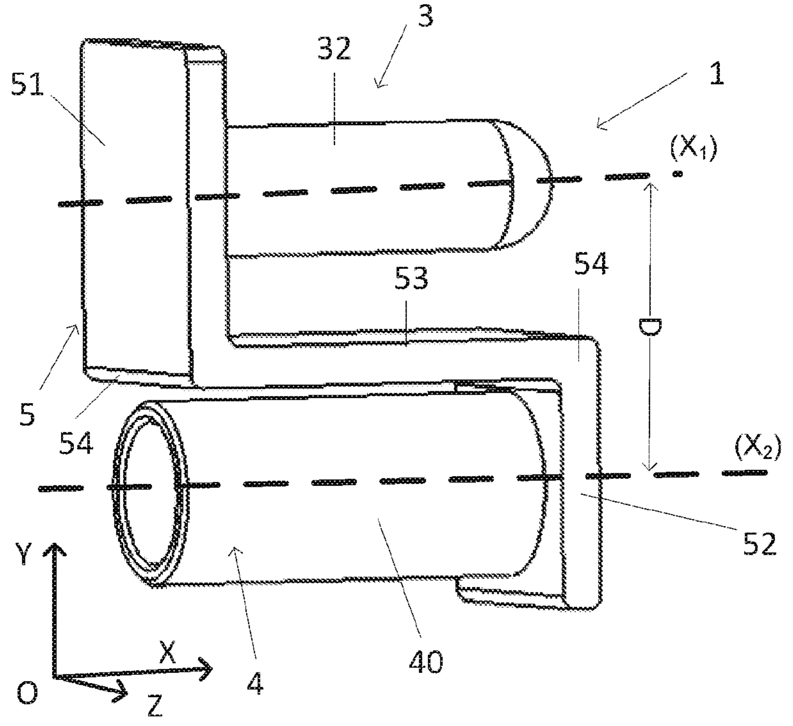
FIGS. 2A and 2B schematically illustrate elevation views in perspective of a second example embodiment of a contact.
Figure 2B:
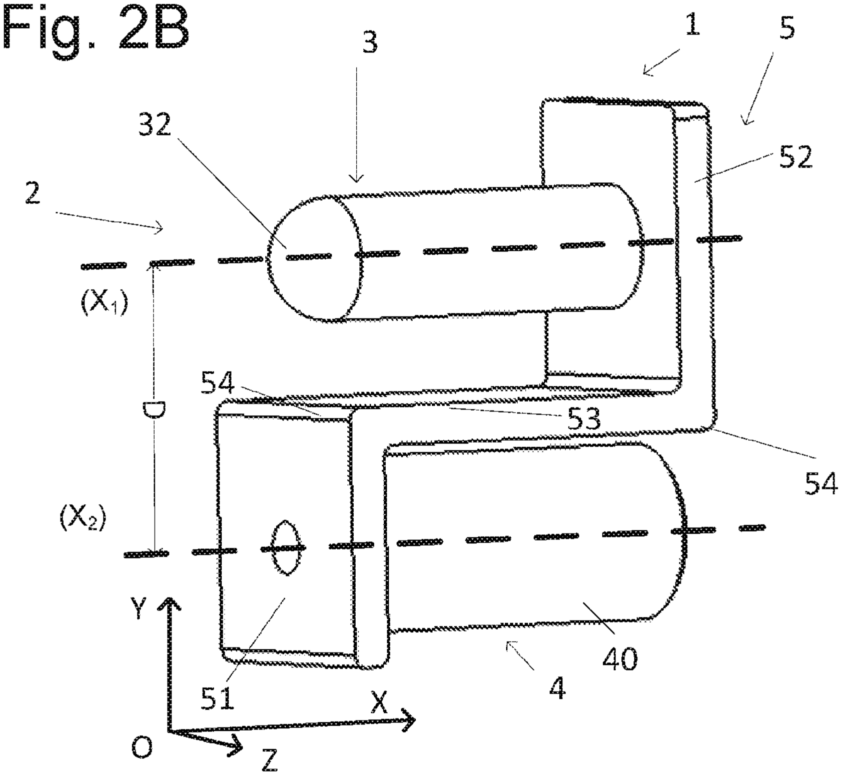
Figure 2C:
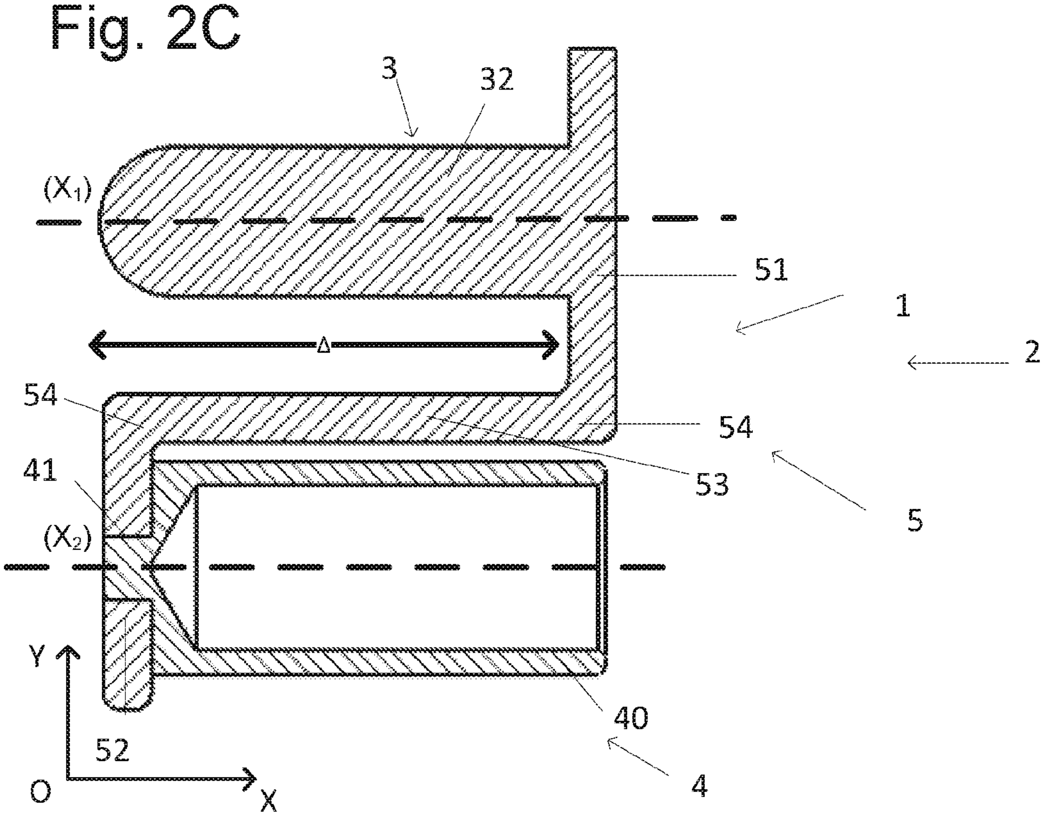
FIG. 2C schematically illustrates a cross section of the second example embodiment of FIGS. 2A and 2B.
Figure 3A:
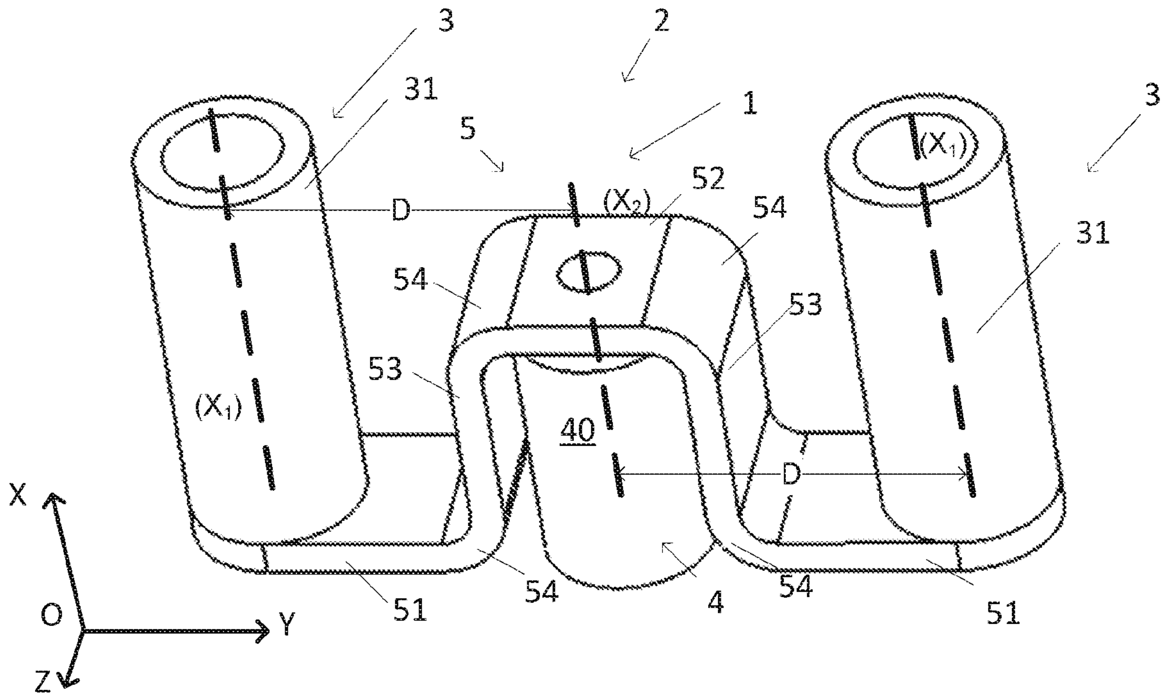
FIGS. 3A and 3B schematically illustrate elevation views in perspective of a third example embodiment of a contact.
Figure 3B:
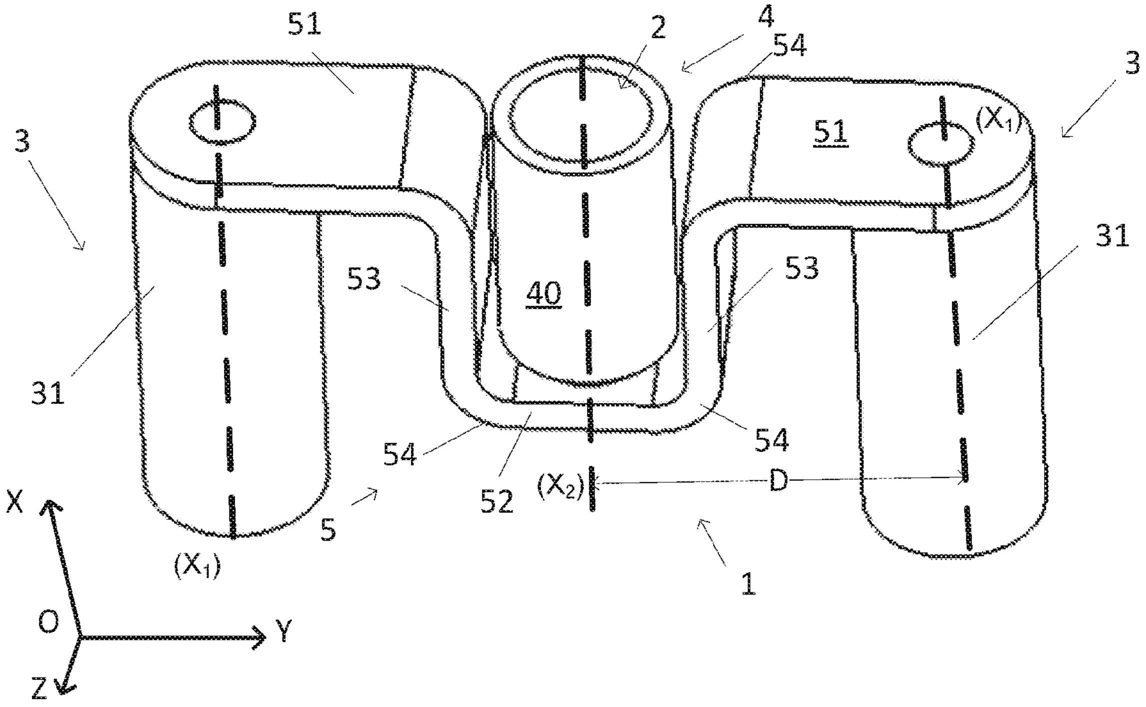
Figure 3C:
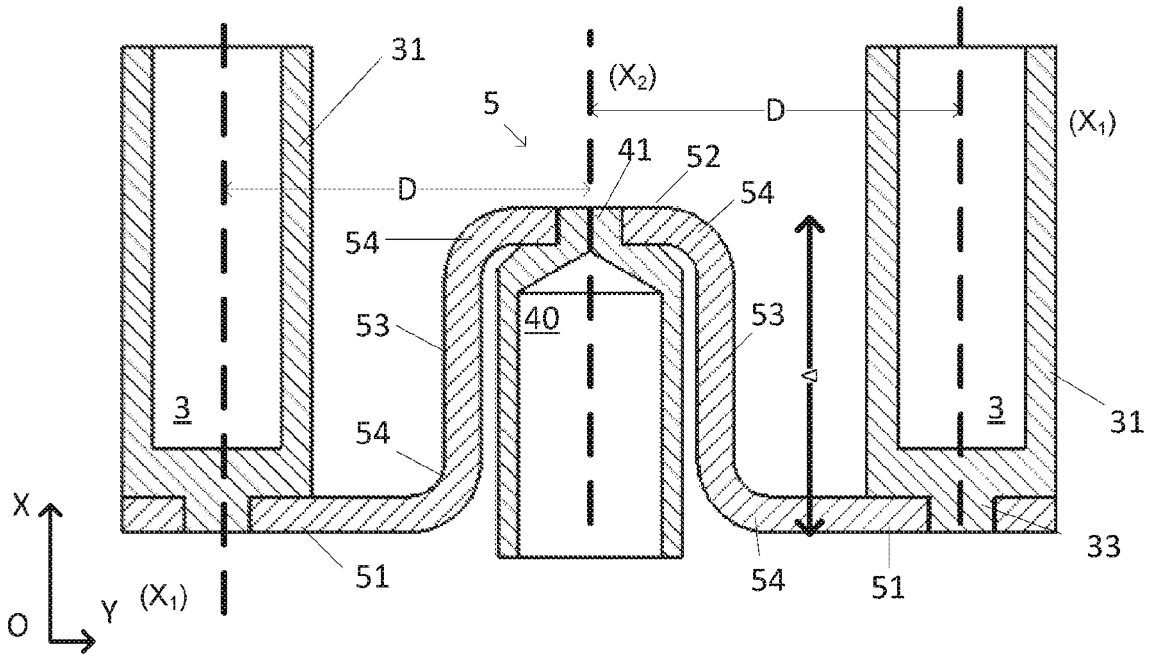
FIG. 3C schematically illustrates a cross section of the third example embodiment of FIGS. 3A and 3B.
Figure 4A:
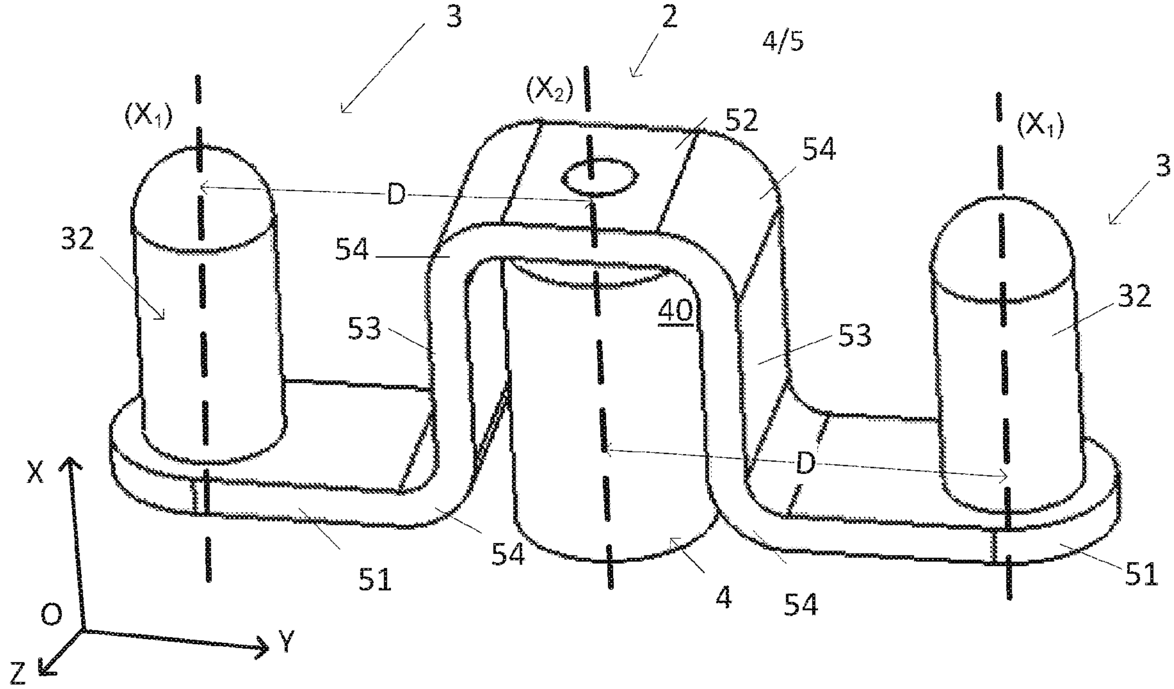
FIGS. 4A and 4B schematically illustrate elevation views in perspective of a fourth example embodiment of a contact.
Figure 4B:
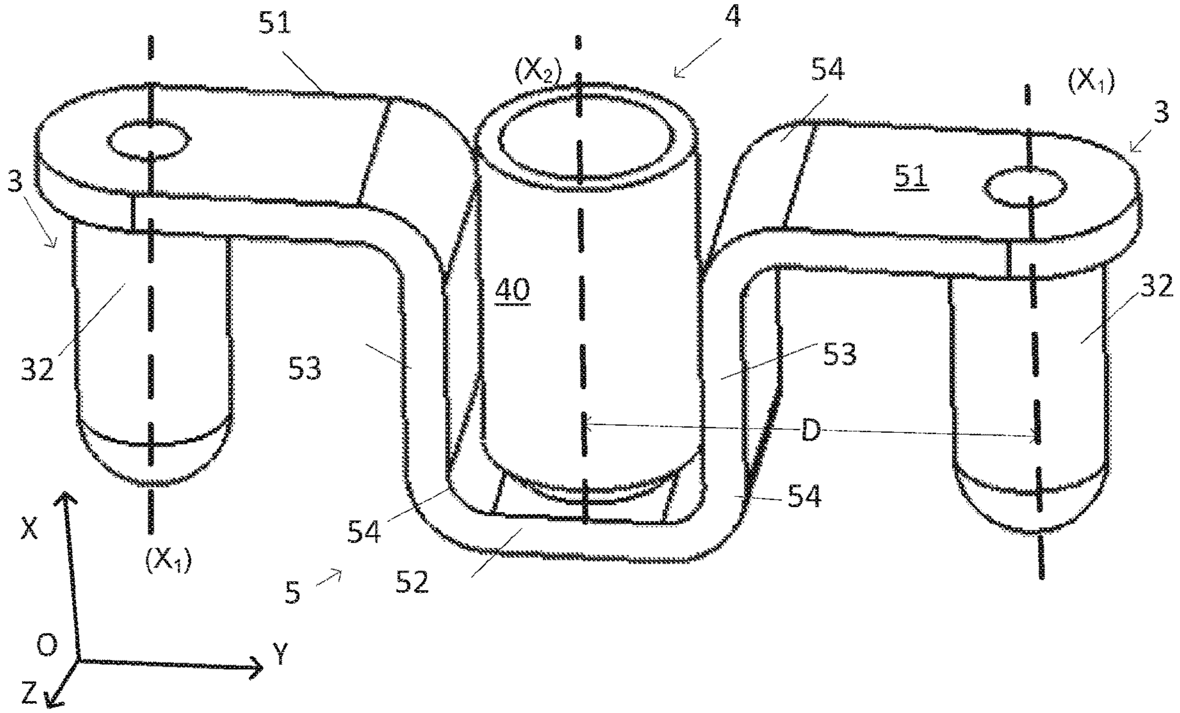
Figure 4C:
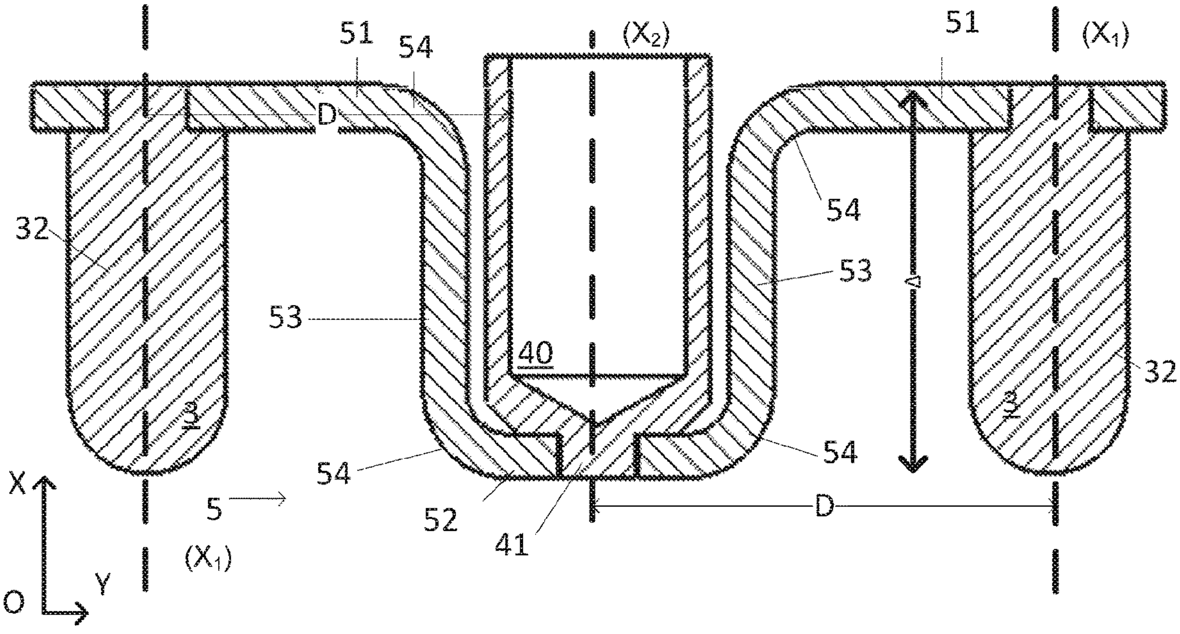
FIG. 4C schematically illustrates a cross section of the fourth example embodiment of FIGS. 4A and 4B.

As illustrated in FIGS. 2A-C, the first link 51 of the junction part 5 may be formed from a block surrounding at least partially the engaging part 3. The block of the first link 51 may be formed integral with the barrel 31 of the engaging part 3.

As illustrated in FIGS. 1A-C, the body 53 may include a block, the block surrounding at least partially the engaging part 3. The block of the body 53 may be formed integral with the barrel 31 of the engaging part 3. The block of the body 53 and the block of the first link 51 may be formed integral with each other. In some embodiments, as illustrated in FIGS. 2A-C, 3A-C, 4A-C, the body 53 may include a sheet.

As illustrated in FIGS. 2A-C, 3A-C and 4A-C, the first link 51 of the junction part 5 may include a flange for linking with an extremity 33 of the engaging part 3. As illustrated in FIGS. 2A-C, the first link 51 of the junction part 5 may be formed integral with the engaging part 3, as a non-limiting example. As illustrated in FIGS. 3A-C and 4A-C, the first link 51 of the junction part 5 may be attached to the extremity 33 of the engaging part 3. In some embodiments, the junction part 5 may be configured to electrically connect with the engaging part 3 by at least one of soldering, mounting by force or using nuts and bolts, as non-limiting examples.

In some embodiments, the second link 52 of the junction part 5 may include a block surrounding at least partially the wiring part (not shown in the Figures). In some embodiments, as illustrated in FIGS. 1C, 2C, 3C and 4C, the second link 52 of the junction part 5 may include a flange for attaching to an extremity 41 of the wiring part 4.

In some embodiments, as illustrated in FIGS. 1A-C, the wiring part substantially totally overlaps the engaging part. In some embodiments, as illustrated in FIGS. 2A-C, the engaging part substantially totally overlaps the wiring part.

In some embodiments, as illustrated in FIGS. 3A-3C and 4A-C, the contact 1 may include a plurality of engaging parts 3 for a single wiring part 4, the junction part 5 being configured to electrically connect the wiring part 4 and the plurality of engaging parts 3. In FIGS. 3A-3C and 4A-C, the axes ($X_1$) and the axis ($X_2$) are located in the same plane, but it should be understood that the axes ($X_1$) and the axis ($X_2$) may be located in different planes, with a first plane being defined by a first axis ($X_1$) and the axis ($X_2$) and a second plane being defined by a second axis ($X_1$) and the axis ($X_2$). In FIGS. 3A-3C and 4A-C, the plurality of engaging parts 3 includes two engaging parts, but any number of engaging parts 3 is envisaged.

In some embodiments, the junction part 5 may be configured to electrically connect with the wiring part 4 by at least one of soldering, mounting by force or using nuts and bolts, as non-limiting examples. In some embodiments, the connection of the wiring part 4 with the electrical wiring (e.g. by at least one of soldering or mechanical plastic deformation) may happen before the wiring part 4 is connected to the junction part 5. In some examples, the connection of the wiring part 4 with the electrical wiring (e.g. by soldering) may happen after the wiring part 4 is connected to the junction part 5. In some examples, the junction part 5 may be configured to electrically connect with the wiring part 4 by being made integral with the wiring part 4.

Figure 6:
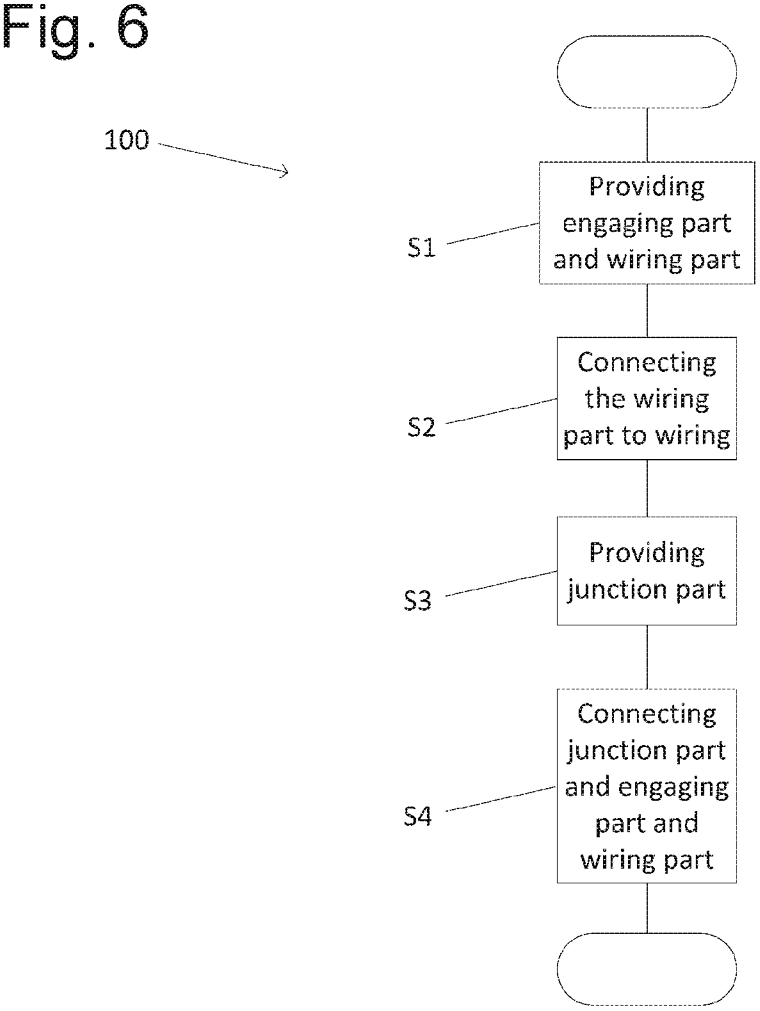
FIG. 6 is a flowchart schematically illustrating an example method of manufacture of the contact of any one of the aspects of the disclosure.

An example method 100 of manufacture of an electrical contact for a connector is illustrated in FIG. 6. The method 100 includes:

providing at S1 a conductive engaging part of the contact, extending substantially along a first longitudinal axis, the conductive engaging part being configured to electrically connect with a corresponding conductive engaging part of another electrical contact of another connector;

providing, at S1, a conductive wiring part of the contact, extending substantially along a second longitudinal axis;

electrically connecting, at S2, the conductive wiring part to electrical wiring of the connector;

providing, at S3, a conductive junction part of the contact; and electrically connecting, at S4, the conductive junction part to the engaging part and the wiring part, such that the first longitudinal axis of the engaging part is substantially parallel to the second longitudinal axis of the wiring part, the first longitudinal axis of the engaging part and the second longitudinal axis of the wiring part further being offset with respect to each other so that the engaging part and the wiring part are not aligned with each other, and the junction part being further configured to electrically connect the engaging part and the wiring part such that the engaging part and the wiring part at least partially overlap each other, substantially along the first longitudinal axis and the second longitudinal axis.

The method 100 may be performed for manufacturing the contact of any of the aspects of the disclosure.

The conductive engaging part 3, the conductive wiring part 4 and the conductive junction part 5 may be made of any electrically conductive material, such as a metal such as an alloy including copper.

The conductive engaging part 3, the conductive wiring part 4 and the conductive junction part 5 may have any cross sections, such as having a cross-section between 50 $mm^2$ and 300 $mm^2$, as non-limiting examples. The conductive engaging part 3, the conductive wiring part 4 and the conductive junction part 5 may have of any dimensions, such as having a cross-section between 50 $mm^2$ and 300 $mm^2$, as non-limiting examples.

What is claimed is:

1. An electrical contact for a connector, comprising:

a conductive engaging part extending substantially along a first longitudinal axis and configured to electrically connect with a corresponding conductive engaging part of another electrical contact of another connector, wherein the engaging part comprises at least one of a barrel so that the contact forms a female contact or a pin so that the contact forms a male contact;

a conductive wiring part extending substantially along a second longitudinal axis and configured to electrically connect with electrical wiring of the connector, wherein the wiring part comprises a barrel for connecting with the electrical wiring of the connector by at least one of soldering and mechanical plastic deformation; and a conductive junction part configured to electrically connect the engaging part and the wiring part, such that the first longitudinal axis of the engaging part is substantially parallel to the second longitudinal axis of the wiring part, the first longitudinal axis of the engaging part and the second longitudinal axis of the wiring part further being offset with respect to each other so that the engaging part and the wiring part are not aligned with each other, and wherein the junction part is further configured to electrically connect the engaging part and the wiring part such that the engaging part and the wiring part at least partially overlap each other, substantially along the first longitudinal axis and the second longitudinal axis.

2. The contact of claim 1, wherein the junction part comprises:

a first link for linking with the engaging part;

a second link for linking with the wiring part; and a body extending between the first link and the second link, the first link, the body, and the second link having substantially a shape having two shoulders, and wherein the body is further configured to extend between the engaging part and the wiring part, substantially along the first longitudinal axis and substantially along the second longitudinal axis, to at least partially overlap the engaging part and the wiring part.

3. The contact of claim 2, wherein the body is further configured to extend between the engaging part and the wiring part to fully overlap the engaging part and/or to fully overlap the wiring part.

4. The contact of claim 1, wherein the first link of the junction part comprises at least one of:

a block surrounding at least partially the engaging part, and a flange for linking with an extremity of the engaging part.

5. The contact of claim 1, wherein the second link of the junction part comprises at least one of:

a block surrounding at least partially the wiring part, and a flange for linking to an extremity of the wiring part.

6. The contact of claim 1, wherein the body comprises at least one of a block and a sheet.

7. The contact of claim 1, wherein at least one of the engaging part or the wiring part totally overlap the wiring part or the engaging part, respectively.

8. The contact of claim 1, comprising a plurality of engaging parts for a wiring part, the junction part being configured to electrically connect the wiring part and the plurality of engaging parts.

9. The contact of claim 1, wherein the junction part is configured to electrically connect with the wiring part by at least one of: being made integral with the wiring part, soldering, mounting by force or using nuts and bolts.

10. The contact of claim 1, wherein the junction part is configured to electrically connect with the engaging part by at least one of: being made integral with the engaging part, soldering, mounting by force or using nuts and bolts.

11. The contact of claim 1, wherein the first link, the second link, and the body are made integral with each other or are made of several parts affixed to each other.

12. A connector comprising:

an electrical insulator; and the contact of claim 1.

13. A method of manufacture of an electrical contact for a connector, comprising:

providing a conductive engaging part of the contact, extending substantially along a first longitudinal axis, the conductive engaging part being configured to electrically connect with a corresponding conductive engaging part of another electrical contact of another connector, wherein the engaging part comprises at least one of a barrel so that the contact forms a female contact or a pin so that the contact forms a male contact;

providing a conductive wiring part of the contact, extending substantially along a second longitudinal axis, wherein the wiring part comprises a barrel for connecting with the electrical wiring of the connector by at least one of soldering and mechanical plastic deformation;

electrically connecting the conductive wiring part to electrical wiring of the connector;

providing a conductive junction part of the contact; and electrically connecting the conductive junction part to the engaging part and the wiring part, such that the first longitudinal axis of the engaging part is substantially parallel to the second longitudinal axis of the wiring part, the first longitudinal axis of the engaging part and the second longitudinal axis of the wiring part further being offset with respect to each other so that the engaging part and the wiring part are not aligned with each other, and the junction part being further configured to electrically connect the engaging part and the wiring part such that the engaging part and the wiring part at least partially overlap each other, substantially along the first longitudinal axis and the second longitudinal axis.

* * * * *